United States Patent

[11] 3,619,656

[72] Inventor Douglas C. Domke
Scottsdale, Ariz.
[21] Appl. No. 15,050
[22] Filed Feb. 27, 1970
[45] Patented Nov. 9, 1971
[73] Assignee Motorola, Inc.
Franklin Park, Ill.

[54] BILATERAL VOLTAGE RESPONSIVE SWITCH
4 Claims, 1 Drawing Fig.

[52] U.S. Cl. .......... 307/255,
307/252 B, 307/252 T, 307/303, 315/196, 323/24
[51] Int. Cl. .......... H03r 17/56,
G05f
[50] Field of Search .......... 323/24;
307/252.73, 303, 305, 324, 255, 288, 252 B;
315/100 D, 196; 317/235 P

[56] References Cited

UNITED STATES PATENTS

| | | | |
|---|---|---|---|
| 3,274,397 | 9/1966 | Heckman et al. | 307/324 X |
| 3,441,830 | 4/1969 | Duddridge | 307/305 X |
| 3,447,067 | 5/1969 | Spofford | 323/24 X |
| 3,526,003 | 8/1970 | Grannieri | 307/305 X |

OTHER REFERENCES

Electronic Design, " Thyristor Triggering is Sure-Fire with the SUS and SBS," pp. 38- 42, Aug. 30, 1966, copy in Class 323- 24.

*Primary Examiner*—William H. Beha, Jr.
*Attorney*—Mueller & Aichele

ABSTRACT: An improvement is disclosed for a known bilateral voltage responsive switch comprising a pair of high resistors connected across the voltage responsive terminals thereof.

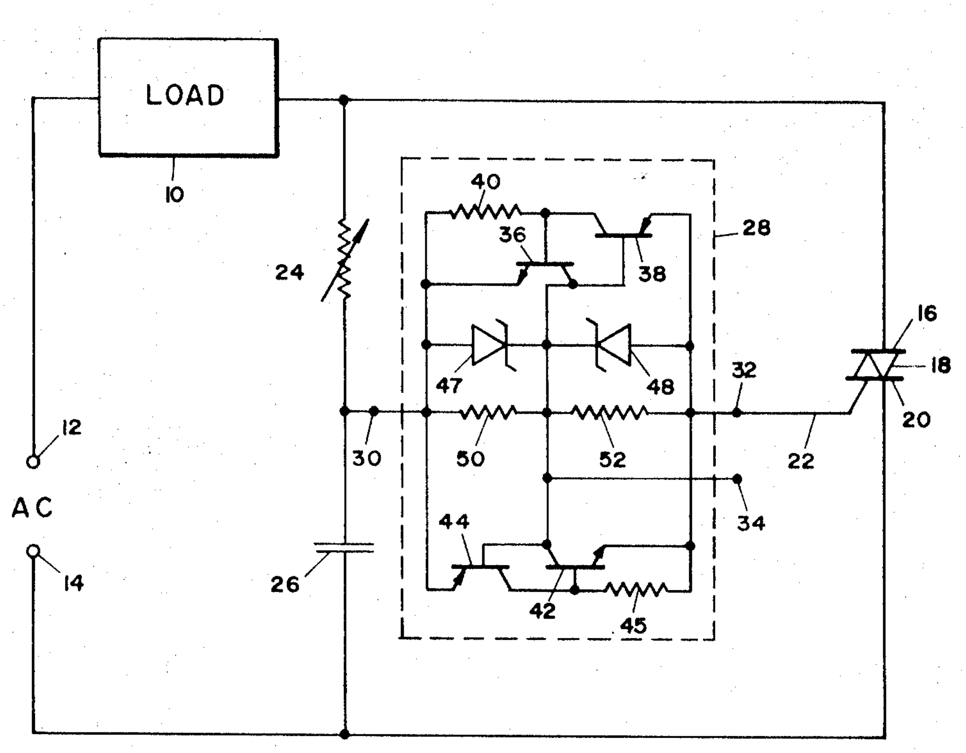
INVENTOR.
Douglas C. Domke
BY
Mueller, Aichele, & Rauner
Att'ys

BILATERAL VOLTAGE RESPONSIVE SWITCH

BACKGROUND

A known bilateral voltage responsive switch comprises two pairs of complementary transistors. Each transistor of a pair has a collector-to-base connection with the other transistor of that pair. The emitters of the transistors are connected to the voltage terminals in such a manner that the transistors comprising each pair are faced in the same direction between the terminals but the pairs of transistors face in opposite direction between the voltage terminals. Respective resistors are connected between the base and the emitter of one transistor of each pair. Zener diodes are also connected in series across the voltage terminals and the junction of the zener diodes is connected to the bases of a transistor of each pair. In such a known bilateral switch, the resistance across the two voltage terminals is very high in both directions until the voltage across the terminals rises to the breakdown voltage of one of the zener diodes. The resistance across the terminals then becomes very low in one direction and remains low as long as a zener diode is broken down. When the voltage across the voltage terminal reverses, the bilateral switch acts similarly, that is, it remains at a high-resistance value until the voltage in the other direction causes breakdown of the other zener diode, whereby the resistance of the switch in the other direction is greatly reduced. Such a switch has many uses, a well-known use being to control the duty cycle of a load, that is the percentage of the time of each half cycle of an AC voltage supply that is applied to the load, as by control of the conductivity of a triac. A triac is a solid state switch whose conductivity is very low in both directions through its main electrodes until a voltage of the proper amplitude is applied to its control electrode and then its conductivity becomes very high in both directions and remains high, even through the control voltage is removed from its control electrode, until the voltage across the main electrodes is reduced to a low-value approaching zero. Such known use of a known bilateral switch, however, suffers from faults including hysteresis and lack of linear control. The hysteresis effect results from the different residual charges being left on the charging capacitor comprising a part of the control circuit for the switch after successive half cycles. This hysteresis effect prevents the switch from providing linear power control to the load, that is, smooth continuous power changes for the load are not obtainable. This fault may manifest itself as flicker in a load comprising a light since the light has more power applied to it during successive half cycles of applied AC, or in vibration of the motor when a motor load is used.

Prior art bilateral voltage controlled switches use zener diodes as their triggering elements whereby the switches switch at relatively high-voltage, that is, the breakdown voltage of the zener diodes, whereby the full range control is not possible.

It is an object of this invention to provide an improved bilateral voltage control switch which may be used for AC phase control triggering.

It is a further object of this invention to provide a bilateral voltage controlled switch that exhibits a substantially decreased hysteresis effect.

Another object of this invention is to provide a bilateral voltage controlled switch that responds to a lower level of voltage than known such switches.

SUMMARY

According to this invention, the zener diode may be omitted and a resistor is substituted for each of the two zener diodes. Or if desired and if convenient, the resistors may be added, one across each one of the zener diodes. Since the resistors are always conductive, their presence may prevent the zener diodes from becoming conductive, whereby the zener diodes, if present, perform no function. Since the substituted or added resistors can be made very nearly equal, the charge on the control capacitor does not vary from half cycle to half cycle, whereby the control provided by the inventive switch is more uniform than the control produced by the prior art switches. Since the added or substituted resistors are always conductive, the residual charge on the control capacitor leaks off the capacitor while the switch is in its nonconductive state and also the control may take place at a lower voltage level than with known such switches using zener diodes.

DESCRIPTION

The invention will be better understood upon reading the following description in connection with the accompanying drawing of which the single figure comprises a showing of the inventive switch in a known circuit with which it cooperates.

Turning to FIG. 1, a load 10, which may be any desired electrical load such as a light bulb or an electrical motor, is to be supplied, in a controlled manner, from a source of alternating current (AC) to be connected between the terminal 12 and 14. The terminal 12 is connected to one terminal of the load 10 and the other terminal of the load is connected to a main electrode 16 of a triac 18. The other main terminal 20 of the triac 18 is connected to the other supply terminal 14. As is known, when a control voltage of the proper magnitude is applied to the control electrode 22 of the triac 18, the triac 18 becomes conductive and current flows through the load 10 and the triac 18 in series until the voltage of the load 10 drops below a minimum value which is close to zero. When a voltage is again applied to the load 10, the triac 18, not being conductive, prevents current flow through the load 10 until control voltage is again applied to the control electrode 22. Therefore, the average current flowing into load 10 may be controlled by controlling the duty cycle or the proportionate length of the half cycles of the supplied AC that the triac 18 is conductive. Control voltage is applied to the control electrode 22 by the circuit to be described including the switch 28.

A variable resistor 24 and a capacitor 26 are connected in series across the main electrodes 16 and 20 of the triac 18. A bilateral switch 28 is connected between the junction of the resistor 24 and the capacitor 26 and the control electrode 22. The bilateral switch 28 may be deposited on the chip, indicated by the dotted rectangle, having three terminals, 30, 32 and 34. The terminals 30 and 32 are the voltage supply terminals and are respectively connected to the junction of the resistor 24 and the capacitor 26 and to the control electrode 22 of the triac 18. A control terminal 34 is provided for the chip 28 but is not used in the load circuit here illustrated, and is therefore not connected. However, in other uses of the chip 28, control voltages may be applied to the control electrode 34.

The chip 28 comprises an NPN transistor 36 and a PNP transistor 38, the collector of the transistor 38 being connected to the base of the transistor 36 and to the emitter of the transistor 36 by way of a biasing resistor 40. The base of the transistor 38 is connected to the collector of the transistor 36 and the emitters of the transistors 36 and 38 are connected respectively to the terminals 30 and 32. The chip 28 further comprises an NPN transistor 42 and a PNP transistor 44, the collector of the transistor 42 being connected to the base of the transistor 44 and the collector of the transistor 44 being connected to the base of the transistor 42. A biasing resistor 45 is connected between the base and the emitter of the transistor 42. The emitters of the transistors 42 and 44 are connected respectively to the terminals 32 and 30. The collectors of the transistors 36 and 42 and the bases of the transistors 38 and 44 are connected directly together. A pair of zener diodes 47 and 48 are provided whose anodes are connected to the terminals 30 and 32 respectively and whose cathodes are connected together and to the connection between the bases of the transistors 38 and 44.

The circuit including the chip 28 as so far described (but without the use of resistors 50 and 52) is known. Let it be assumed that the terminal 12 is going up in the positive direction. No current flows through the load 10 by way of the triac 18 since the triac 18 is not conductive. A minimum current flows into the capacitor 26 by way of resistor 24 and the voltage across the capacitor 26 rises on a voltage v. time curve (not shown) which depends in shape on the time constant of the resistor 24 and the capacitor 26. The voltage across the capacitor 26 is applied across the terminals 30 and 32 of the chip 28 in series with the control electrode 22 of the triac 18. No current flows between the terminals 30 and 32 until a zener diode 47 or 48 is broken down, it being remembered that the circuit 28 is being treated as if the resistors 50 and 52 were not provided. If the terminal 12 is positive, at a certain time after the beginning of the cycle, depending on the time constant of the resistor 24 and the capacitor 26, the zener diode 48 breaks down and bias current is provided for the base of the transistor 44 by way of its emitter. The transistor 44 becomes conductive whereby current flows through the resistor 45. As soon as the voltage drop across the resistor 45 is great enough to provide sufficient base to emitter voltage for the transistor 42, the transistor 42 conducts. The resistance between the terminals 30 and 32 suddenly drops to or close to zero and the current stored in the capacitor 26 is applied to the control electrode 22 to render the triac 18 conductive. Current flows through the load 10 and the triac 18 for the remainder of the positive cycle and the triac goes off when the AC supply goes down to or close to zero. The terminal 14 becomes positive and the zener diodes 47 breaks down as soon as the voltage applied thereto becomes high enough, this time again depending on the adjustment of the time constant circuit comprising the resistor 24 and the capacitor 26. Upon breakdown of the zener diode 47, the transistor 38 becomes conductive and the transistor 36 also becomes conductive and again the voltage across the terminals 30 and 32 drops very close to zero and the triac 18 is made conductive again to apply current in the opposite direction through the load 10. Therefore, upon adjustment of the resistor 24 to adjust the time constant of the resistor 24 and the capacitor 26, the triac 18 is made conductive sooner or later in each successive half cycle to cause the duty cycle of the triac 18 to vary the power supply to the load 10. However, to prevent hysteresis during each half cycle, the capacitor 26 must discharge into the control electrode 22 of the triac 18 to the same degree leaving the successive charges on the capacitor 26 equal to each other at the beginning of each successive half cycle. To accomplish this, the zener diodes 47 and 48 must have exactly the same breakdown voltage and leakage current. This is very difficult to accomplish.

In accordance with this invention, the equal resistors 50 and 52 are connected in series across the terminals 30 and 32 and the junction of the resistors 50 and 52 is connected to the connector joining the bases of the transistors 38 and 44. In providing the resistors 40 and 45 on a small chip, a pinching process is used. Tat is, the resistors 44 and 45 are first provided by diffusing material into the substrate on which the circuit of the chip 28 is deposited, resulting in resistors that are much too small in value since the length of the resistors 40 and 45 is limited by the small size of the chip 28. Then the resistance value of the resistors 40 and 45 is increased by diffusing a material into the resistors that is nonconductive, making narrower or pinching off the resistors 40 and 45, until the remaining cross-sectional area thereof is such that the resistors 40 and 45 have the correct high-value. This known pinching off process produces the zener diodes 47 and 48 connected as shown incidentally to producing the resistors 40 and 45, the junction of the zener diodes 47 and 48 being the substrate for the chip 28. However, due to the presence of the resistors 50 and 52, the voltage across the zener diodes 47 and 48 rarely if of rises to the breakdown point for the zener diodes 47 and 48 and the circuit on the chip 28 acts as if the zener diodes 47 and 48 were not present. The resistors 50 and 52 are provided using the same pinch off process but this can only result in modifying the zener diodes 47 and 48. The result is that in the normal production of the chip 28, the zener diodes 47 and 48 are incidentally provided but they are not necessary parts of this inventive circuit and if the circuit on the chip 28 were made up of discrete elements, the zener diodes 47 and 48 would normally be omitted.

The circuit on the chip 28 operates in a similar manner to that described for it hereinabove where it was postulated that there was no resistors 50 and 52, except however that a very small current flows between the terminals 30 and 32 through the resistors 50 and 52 at all times that a voltage is applied across these terminals. When this voltage is positive on the terminals 30, current flows through the resistor 52, causing base current for the transistor 44 to flow rendering it conductive, which causes conduction of the transistor 42. The voltage at the terminal 30 with respect to the terminal 32 must be such as to cause sufficient current to flow in the resistor 45 to overcome the base to emitter diode drop of the transistor 42. The current flow through the circuit of the chip 28 in the opposite direction depends on the current flow through the resistor 50 and the subsequent conduction of transistors 36 and 38. Therefore, the circuit of the chip 28 acts as a voltage sensitive gate and, since the voltage across the terminals 30 and 32 depends on the setting of the resistor 24, the duty cycle of the triac 18 may be controlled by varying the resistor 24. However, due to the presence of the resistors 50 and 52, the threshold for the switch of the chip 28 can be lower whereby a greater portion of each half cycle of the applied AC may be utilized than in prior art circuits using zener diodes 47 and 48. Also, the capacitor 26 is more uniformly discharged between half cycles of the AC since the sum of the resistors 50 and 52, in the discharge circuit of the capacitor 26, controls the discharge of the capacitor 26 and this sum is always constant, rather than the breakdown of one only of the zener diodes 47 and 48 controlling the discharge of the capacitor 26 in the prior art circuit. This is due to the fact that the breakdown voltage and leakage current of the two zener diodes 47 and 48 will not always be the same. Therefore, not only is a greater range of control possible using the described circuit where the resistors 50 and 52 prevent operation of the zeners 47 and 48 as voltage breakdown devices than if the resistors 50 and 52 were omitted, but also this control is more uniform in that the capacitor 26 will discharge to the same degree between half cycles and will discharge more nearly to zero after each half cycle than when the resistors 50 and 52 are omitted and therefore the positive going current passing through load 10 will always very nearly equal the negative going current passing through load 10. There will therefore be a much reduced tendency toward hysteresis, that is, for a load which comprises a light to flicker or for a load which comprises a motor to vibrate at low-resistance settings of the resistor 24.

The voltage responsive switch described herein may be used in other phase control circuits other than the one shown. For example, instead of using a triac, one may use two silicon controlled rectifiers (SCR) connected back to back or one SCR may be used with a full wave bridge whereby only direct current pulses are applied to the SCR. Or instead of the timing circuit 24 and 26 shown, a cascaded timing circuit may be used.

What is claimed is:

1. A bilateral voltage controlled switch comprising
- a first and a second transistor of a first conductivity type and having main electrodes and a control electrode,
- a third and a fourth transistor of a second conductivity type and having main electrodes and a control electrode,
- a first and a second voltage terminal,
- a first and a second resistor,
- a connection from said first voltage terminal through said first resistor and the main electrodes of said third transistor to said second voltage terminal,
- a connection from said second voltage terminal through said second resistor and the main electrodes of said fourth transistor to said first voltage terminal,
- a connection from said first voltage terminal through the main electrodes of said first transistor to the control electrode of said third transistor, a connection from said second voltage terminal through the main electrodes of said second transistor to the control electrode of said fourth transistor, a connection between the control electrode of said first transistor and the junction of said first resistor and said third resistor, a connection between the control electrode of said second transistor and the junction of said second resistor and said fourth transistor, a connection between the control electrodes of said third and fourth transistors, and a pair of resistors in series between said first and second voltage terminals, said last named connection to said control electrodes being connected to the point between said pair of resistors.

2. The invention of claim 1 in which said transistors and resistors are deposited on a chip.

3. The invention of claim 2 in which a control connection is provided to the junction of said pair of transistors.

4. The invention of claim 2 in which said first and second resistors are pinch type resistors.

* * * * *